United States Patent
Jensen et al.

(10) Patent No.: US 7,377,172 B2
(45) Date of Patent: May 27, 2008

(54) METHOD AND SYSTEM FOR IMPACT DETECTION OF AN IMAGING SYSTEM

(75) Inventors: Vernon T Jensen, Draper, UT (US); Steven E Curtis, Salt Lake City, UT (US)

(73) Assignee: General Electric Company, Schenectady, NY (US)

( * ) Notice: Subject to any disclaimer, the term of this patent is extended or adjusted under 35 U.S.C. 154(b) by 11 days.

(21) Appl. No.: 11/461,302

(22) Filed: Jul. 31, 2006

(65) Prior Publication Data

US 2008/0022780 A1 Jan. 31, 2008

(51) Int. Cl.
*A61B 6/02* (2006.01)
*G01L 11/00* (2006.01)

(52) U.S. Cl. .................................. 73/702; 378/198
(58) Field of Classification Search ........... 250/339.07, 250/339.11; 73/702; 378/198
See application file for complete search history.

(56) References Cited

U.S. PATENT DOCUMENTS

| | | | | |
|---|---|---|---|---|
| 5,216,244 A | * | 6/1993 | Esaki et al. ............ | 250/339.11 |
| 5,225,678 A | * | 7/1993 | Messerschmidt ....... | 250/339.07 |
| 5,278,413 A | * | 1/1994 | Yamaguchi et al. ........ | 250/347 |
| 5,351,282 A | * | 9/1994 | Kadowaki et al. .......... | 378/198 |
| 5,425,069 A | * | 6/1995 | Pellegrino et al. .......... | 378/198 |
| 5,434,411 A | * | 7/1995 | Miyahara et al. ....... | 250/339.07 |
| 5,581,085 A | * | 12/1996 | Reffner et al. ......... | 250/339.07 |
| 6,422,747 B2 | * | 7/2002 | Akutsu et al. .............. | 378/198 |
| 7,016,467 B2 | * | 3/2006 | Brooks ........................ | 378/102 |
| 7,127,032 B1 | * | 10/2006 | Kump ........................ | 378/117 |
| 2001/0024487 A1 | * | 9/2001 | Akutsu et al. .............. | 378/198 |
| 2004/0042587 A1 | * | 3/2004 | Deshpande ................. | 378/198 |

\* cited by examiner

*Primary Examiner*—Andre J Allen

(57) ABSTRACT

A system and method for detecting at least one force, impact, shock, or vibration event on an imaging system. The system comprises a main assembly, a support assembly coupled to the main assembly, and at least one sensor coupled to the imaging system. The at least one sensor is configured to detect at least one force, impact, shock, or vibration event occurring on the imaging system. The method comprises detecting at least one force, impact, shock, or vibration event occurring on the imaging system and providing an indication to a user when a force, impact, shock, or vibration event occurs on the imaging system.

30 Claims, 5 Drawing Sheets

METHOD AND SYSTEM FOR IMPACT DETECTION OF AN IMAGING SYSTEM

BACKGROUND OF THE INVENTION

The present invention relates generally to imaging systems, and more particularly to a system and method for impact detection of an imaging system undergoing a force, impact, shock, or vibration event.

A typical imaging system comprises a source and a detector. An x-ray imaging system includes an x-ray source and an x-ray detector. Many x-ray detectors used in an x-ray imaging system comprise an image intensifier. However, many image intensifiers are being replaced by flat panel detectors on high-end imaging systems. A flat panel detector is more fragile and significantly more expensive than an image intensifier. It is known that mobile imaging systems can be subjected to random force, impact, shock and vibration during transport and/or positioning. Hence, the flat panel detector can create a reliability challenge for the imaging system that can be subjected to random force, impact, shock and vibration during transport and/or positioning.

The primary limitation of an imaging system having a flat panel detector is that there is not a reliable way to detect and document force, impact, shock, or vibration events that occur outside the warranty limits of the system. Unless a means exists to detect and document the force, impact, shock, or vibration events, the cost of replacing a damaged flat panel detector can result in a significant monetary burden for a manufacturer of the imaging system.

In addition to the source and detector, the typical imaging system comprises a main assembly and a support assembly. The main assembly may support the support assembly, and may include the source and/or the detector. The support assembly is typically coupled to the main assembly. The support assembly typically includes the source and/or the detector, and may also include an apparatus to support a subject undergoing imaging. For mobile imaging systems, the main assembly typically includes wheels for moving and/or positioning the imaging system. The support assembly can include roller bearings or wheels also. The main assembly and/or the support assembly typically performs functions that require more precise motion, position accuracy and repeatability, such as acquiring data for a three-dimensional scan. Force, impact, shock, or vibration damage to the main assembly and/or the support assembly associated with mechanical movement of the imaging system may reduce the position accuracy and repeatability. Periodic maintenance can be performed to test and recalibrate the main assembly and/or the support assembly. But the periodic maintenance can be performed less frequently if it is known that the main assembly and/or the support assembly is not been subject to high force, impact, shock, or vibration events during relocation or movement of the imaging system. Hence there exists a need for adapting an efficient mechanism to detect, document and indicate force, impact, shock, or vibration events occurring with an imaging system.

BRIEF DESCRIPTION OF THE INVENTION

The above-mentioned shortcomings, disadvantages and problems are addressed herein which will be understood by reading and understanding the following specification.

In an embodiment, an imaging system comprises a main assembly, a support assembly coupled to the main assembly; and at least one sensor coupled to the imaging system.

In another embodiment, an imaging system comprises a main assembly; a support assembly coupled to the main assembly; a source; a detector; and at least one sensor coupled to the imaging system.

In still another embodiment, a method of detecting at least one force on an imaging system, the method comprises detecting at least one force, impact, shock, or vibration event occurring on the imaging system; and providing an indication to a user when a force, impact, shock, or vibration event occurs on the imaging system.

In still yet another embodiment, a method of detecting at least one force on an imaging system, the method comprises detecting at least one force, impact, shock, or vibration event occurring on the imaging system; recording data related to the at least one force, impact, shock, or vibration event; and providing an indication to a user when a force, impact, shock, or vibration event occurs on the imaging system.

In a further embodiment, a method of detecting at least one force on an imaging system comprises coupling at least one sensor to the imaging system; detecting at least one force, impact, shock, or vibration event on the imaging system; comparing a value of the at least one force, impact, shock, or vibration event to a predetermined threshold value of the at least one sensor; recording data related to the at least one force, impact, shock, or vibration event; and providing an indication to a user when the value of a force, impact, shock, or vibration event occurring on the imaging system is greater than the predetermined threshold value.

Various other features, objects, and advantages of the invention will be made apparent to those skilled in the art from the accompanying drawings and detailed description thereof.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

In various embodiments of the invention, a imaging system having at least one sensor installed thereon is described. However, the embodiments are not limited and may be implemented in connection with different applications. The application of the invention can be extended to other areas. The invention provides a broad concept of detecting a force, impact, shock, or vibration event occurring on the imaging system, recording and storing data related to the event, and indicating the event to a user. The design can be carried further and implemented in various forms and specifications.

In an embodiment, the imaging system may be a mobile imaging system. A mobile imaging system is typically moved within a healthcare facility and positioned within a radiology department, emergency room, operating room or other area. As a result of the mobility of the imaging system a force, impact, shock, or vibration event can occur when the imaging system is manually transported from one location to another, or positioned within a room.

Figure 1:
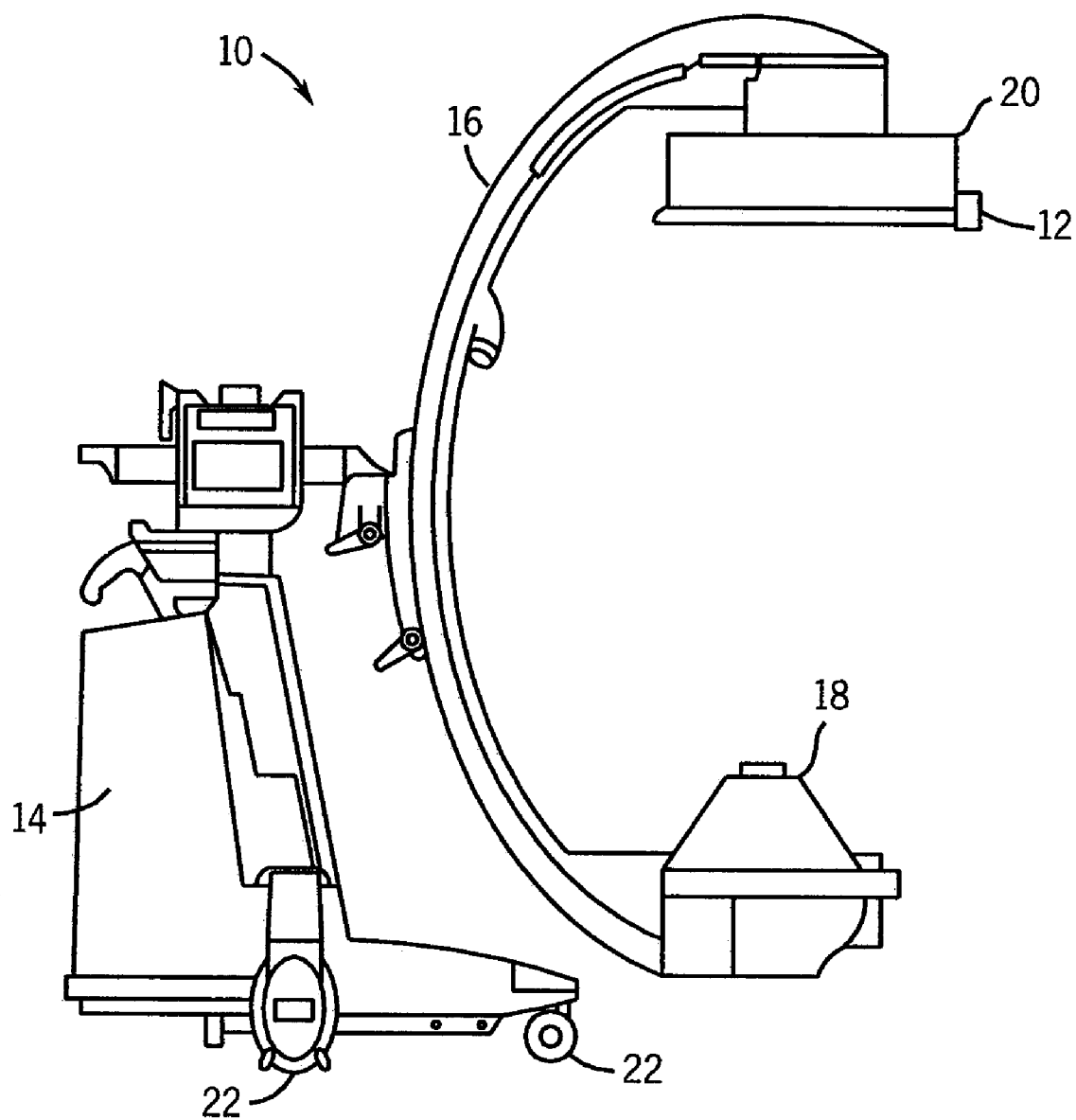
FIG. 1 is a diagram of an exemplary embodiment of an imaging system having at least one sensor installed thereon.

FIG. 1 is a diagram of an exemplary embodiment of an imaging system 10 having at least one sensor 12 installed thereon. The imaging system 10 comprises a main assembly 14, a support assembly 16 coupled to the main assembly 14, at least one source 18, at least one detector 20, and at least one sensor 12 coupled to the imaging system. In an x-ray imaging system, the detector 20 can be a flat panel detector. For mobile imaging systems, the main assembly 14 may be a motorized assembly on wheels 22 for moving and/or positioning the imaging system. The support assembly 16 may or may not include roller bearings or wheels. The main assembly 14 and/or the support assembly 16 are associated with mechanical movement of the imaging system. The main assembly 14 and/or the support assembly 16 perform functions that require precise motion, position accuracy and repeatability, such as acquiring data for an image scan. Periodic maintenance may be performed to test and recalibrate the main assembly 14 and/or the support assembly 16.

In the exemplary embodiment shown in FIG. 1, the support assembly 16 includes the source 18 and the detector 20. In other embodiments, the support assembly may include the source, the detector, and/or an apparatus for supporting a subject undergoing imaging. The support assembly can comprise structural C-shaped members, structural O-shaped members, or imaging tables.

In an embodiment, the at least one sensor 12 is a device designed to detect at least one force, impact, shock, or vibration event that occurs on the imaging system and provide an indication of the at least one event to a user. The at least one sensor 12 may be coupled to the detector 20 of the imaging system.

In another embodiment, the at least one sensor 12 includes a detection device for detecting a force, impact, shock, or vibration event; and an indicator device for providing an audio and/or a visual indication to a user when an event occurs.

Figure 2:
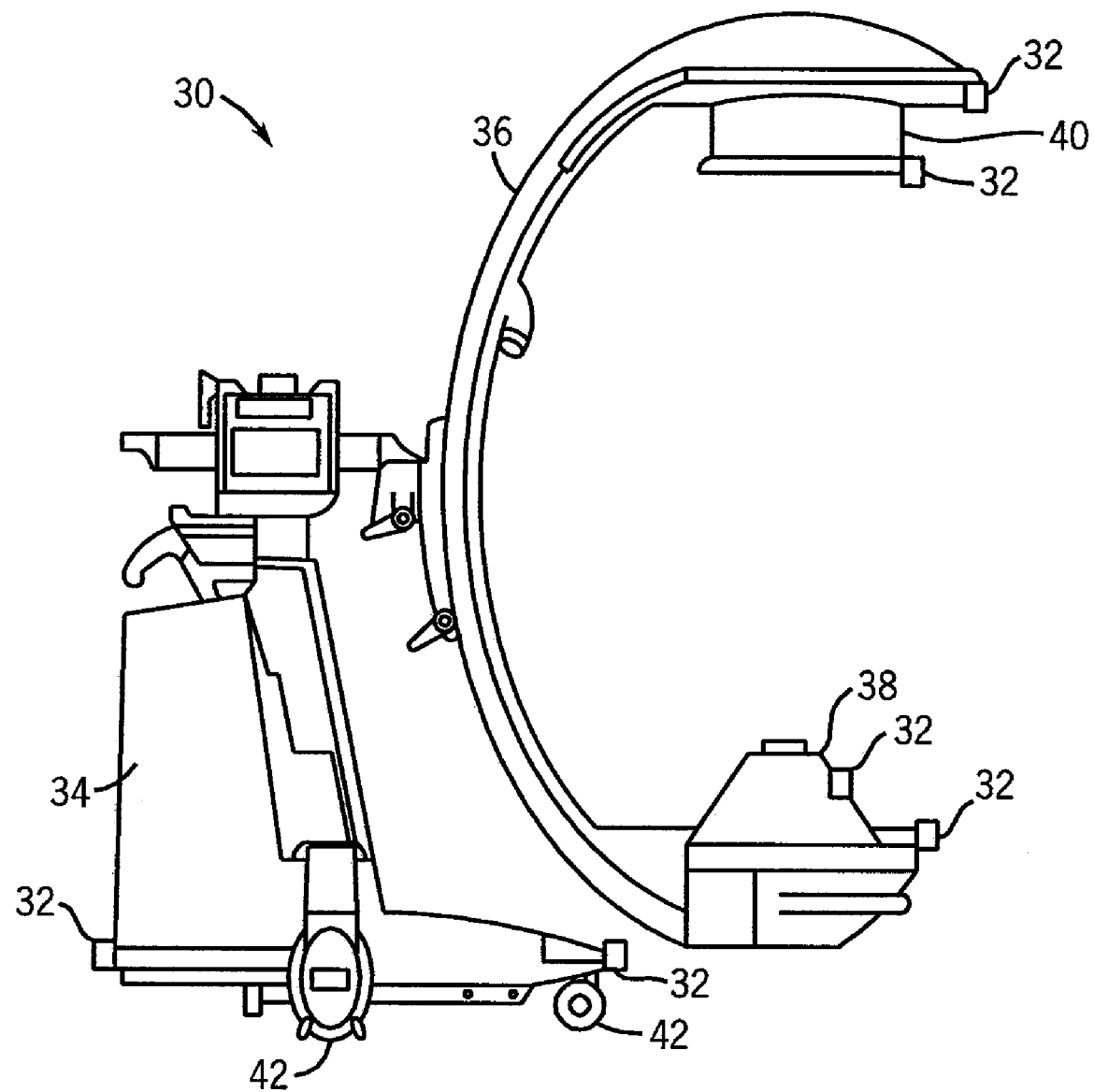
FIG. 2 is a diagram of another exemplary embodiment of an imaging system having at least one sensor installed thereon.

FIG. 2 is a diagram of another exemplary embodiment of an imaging system 30 having at least one force sensor 32 installed thereon. The imaging system 30 comprises a main assembly 34, a support assembly 36 coupled to the main assembly 34, at least one source 38, at least one detector 40, and at least one sensor 32 coupled to the imaging system. In an x-ray imaging system, the detector 40 can be a flat panel detector. For mobile imaging systems, the main assembly 34 may be a motorized assembly on wheels 42 for moving and/or positioning the imaging system. The support assembly 36 may or may not include wheels or roller bearings.

In the exemplary embodiment shown in FIG. 2, the support assembly 36 supports the source 38 and the detector 40. In other embodiments, the support assembly may support the source, the detector, and/or a subject undergoing imaging. The support assembly can comprise structural C-shaped members, structural O-shaped members, or imaging tables.

In an embodiment, the at least one force sensor 32 is a device designed to detect force, impact, shock, or vibration events that occur on the imaging system. The at least one force sensor 32 may be coupled to the main assembly 34, support assembly 36, source 38, and/or detector 40 of the imaging system.

In another embodiment, the at least one sensor 32 detects a force, impact, shock, or vibration event, records data related to the event, stores the data, and provides an indication to a user when a force, impact, shock, or vibration event occurs. The data may include but not be limited to data relating to the value or amplitude of each event, the duration of each event, the number of events that occurred over a period of time, and the time and date each event occurred. The at least one sensor 12 can be passive or battery powered. There are a wide variety of sensors available for use.

In yet another embodiment, the at least one sensor 32 upon detecting an event compares a value of the event to a predetermined threshold value that is stored in memory of the sensor 32 or in memory of the imaging system. The predetermined threshold value is selected based on suitable limits of force, impact, shock, or vibration for the imaging system. When the value of an event exceeds the predetermined threshold value, an indication is provided to indicate to a user that an event has occurred and the value of the event has exceeded the predetermined threshold value.

In still yet another embodiment, the at least one sensor 32 includes a detection device for detecting a force, impact, shock, or vibration event; an indicator device for providing an audio and/or a visual indication to a user when an event occurs, and a memory device for recording and storing data related to the event.

In a further embodiment, the at least one sensor 32 further includes a processor for processing data related to a force, impact, shock, or vibration event. The data provides statistical information giving an account of the events experienced by the imaging system. The data provides documentation necessary to show that the imaging system was subjected to conditions outside the warranty limits. This data may also be used to prove system abuse or to collect valuable use information for future product designs. The data can be reviewed and analyzed by a service engineer in order to obtain a history of the force, impact, shock, or vibration events experienced by the imaging system.

In another further embodiment, the at least one sensor 32 further includes a transceiver device for receiving and transmitting data. The at least one sensor 32 coupled to the imaging system, may receive and transmit data from and to the imaging system.

Figure 3:
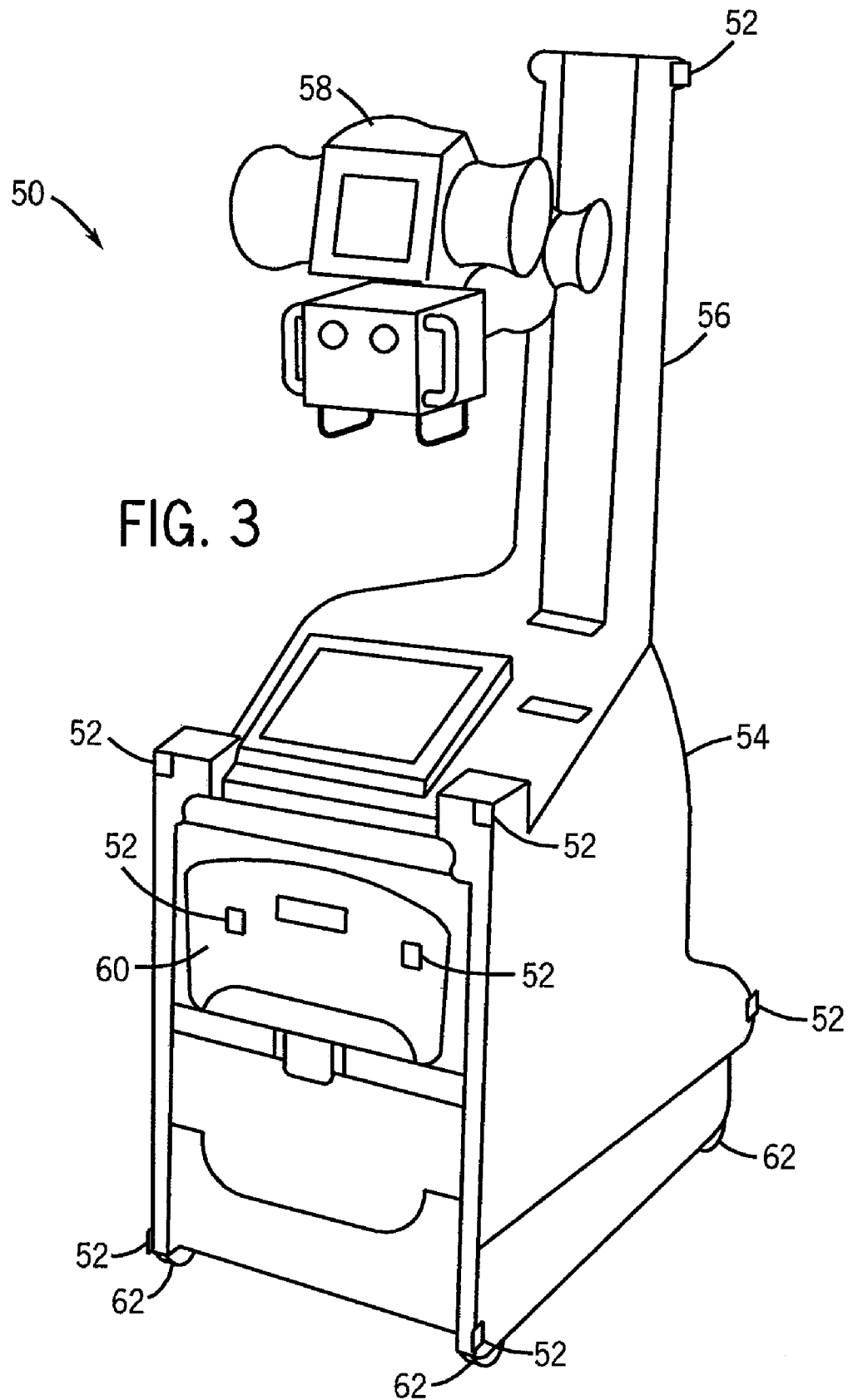
FIG. 3 is a diagram of yet another exemplary embodiment of an imaging system having at least one sensor installed thereon.

FIG. 3 is a diagram of another exemplary embodiment of an imaging system 50 having at least one sensor 52 installed thereon. The imaging system 50 comprises a main assembly 54, a support assembly 56 coupled to the main assembly 54, at least one source 58, at least one detector 60, and at least one sensor 52 coupled to the imaging system. In an x-ray imaging system, the detector 60 can be a flat panel detector. For mobile imaging systems, the main assembly 54 may be a motorized assembly on wheels 62 for moving and/or positioning the imaging system. In the exemplary embodiment shown, the support assembly 56 supports the at least one source 58. In other embodiments, the support assembly can support the source and detector, the detector, and/or an apparatus supporting a subject undergoing imaging. In an embodiment, the at least one sensor 52 is coupled to the imaging system 50 and is designed to detect force, impact, shock, or vibration events that occur on the imaging system. The at least one sensor 52 can be installed or mounted on the main assembly 54, support assembly 56, source 58, and/or detector 60 of the imaging system.

The imaging systems described above can be mobile imaging systems such as a computed tomography (CT) system, a positron emission tomography (PET) system, a magnetic resonance (MR) imaging system, an ultrasound imaging system, or an X-ray imaging system. One of ordinary skill in the art shall however appreciate that an imaging system is not limited to the examples given above.

In an exemplary embodiment, a plurality of sensors are coupled to an imaging system to continuously detect and record force, impact, shock, or vibration events occurring on the imaging system. The plurality of sensors can comprise multiple sensors arranged in a sensor array. Each sensor in the sensor array can provide data as to each force, impact, shock, or vibration event. The plurality of sensors may include different predetermined threshold values to detect and indicate different levels of force, impact, shock, or vibration events occurring on the imaging system.

In another exemplary embodiment, at least one attitude sensor is coupled to an imaging system to provide combined force and orientation information. This embodiment may also include the combination of a force sensor and an attitude sensor.

In yet another exemplary embodiment, at least one sensor is coupled to an imaging system to sense force, position, pressure, orientation, direction and gravitational force. One of ordinary skill in the art shall appreciate that alternative sensors configured to sense other parameters can be used as the sensor and all such sensors lie within the scope of the invention.

Figure 4:
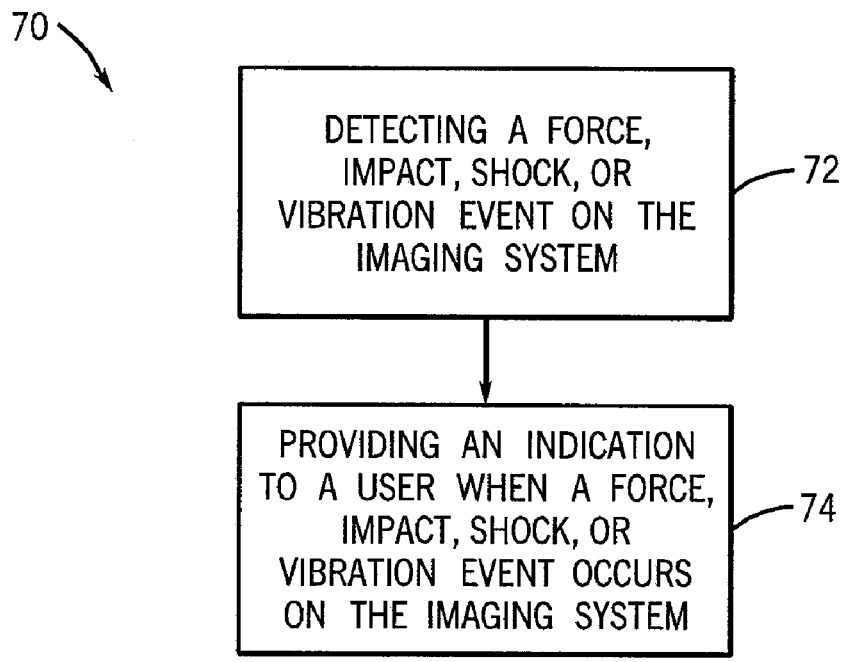
FIG. 4 is a flow diagram of an exemplary embodiment of a method of detecting a force, impact, shock, or vibration event on an imaging system.

FIG. 4 is a flow diagram of an exemplary embodiment of a method 70 of detecting a force, impact, shock, or vibration event on an imaging system. The method 70 comprises steps of detecting at least one force, impact, shock, or vibration event on the imaging system 72 through the use of at least one sensor installed on the imaging system; and providing an indication to a user when a force, impact, shock, or vibration event occurs on the imaging system 74.

Figure 5:
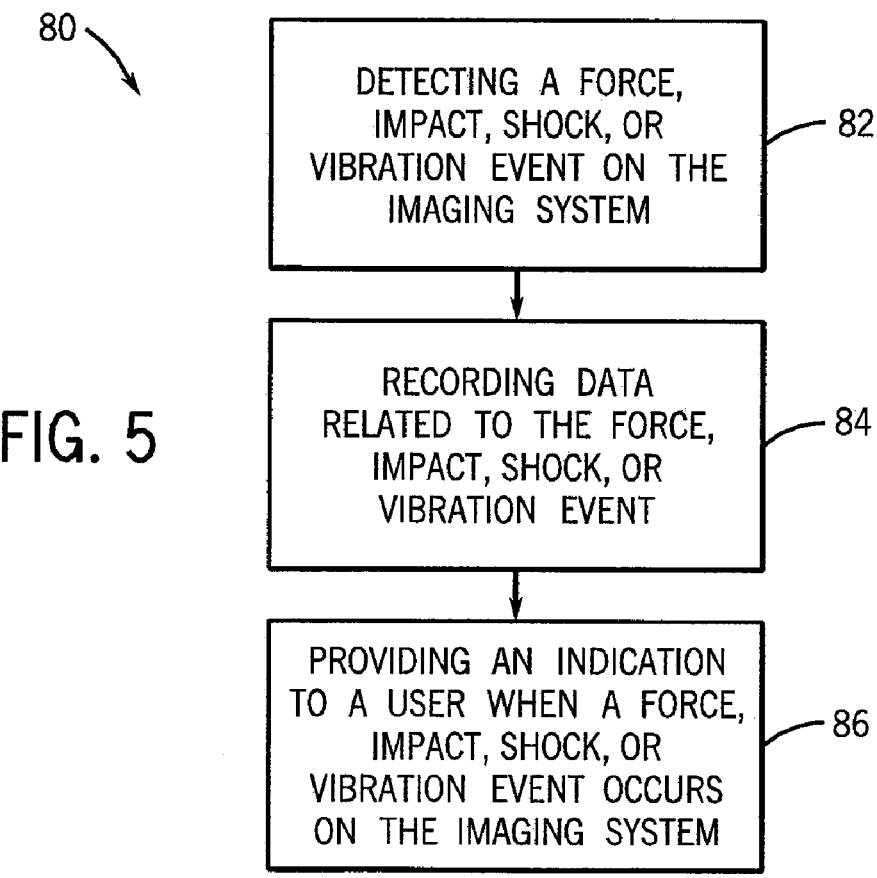
FIG. 5 is a flow diagram of another exemplary embodiment of a method of detecting a force, impact, shock, or vibration event on an imaging system.

FIG. 5 is a flow diagram of an exemplary embodiment of a method 80 of detecting a force, impact, shock, or vibration event on an imaging system. The method comprises steps of detecting a force, impact, shock, or vibration event on the imaging system 82 through the use of at least one sensor installed on the imaging system; recording data related to each force, impact, shock, or vibration event 84; and providing an indication to a user when a force, impact, shock, or vibration event occurs on the imaging system 86. The data recorded may include but not be limited to data relating to the value or amplitude of each event, the duration of each event, the number of events that occurred over a period of time, and the time and date each event occurred. The indication provided can be an audio or a visual indication. The method 80 may further comprise recording and storing the data related to each force, impact, shock, or vibration event in memory on the at least one sensor and/or in memory on the imaging system.

Figure 6:
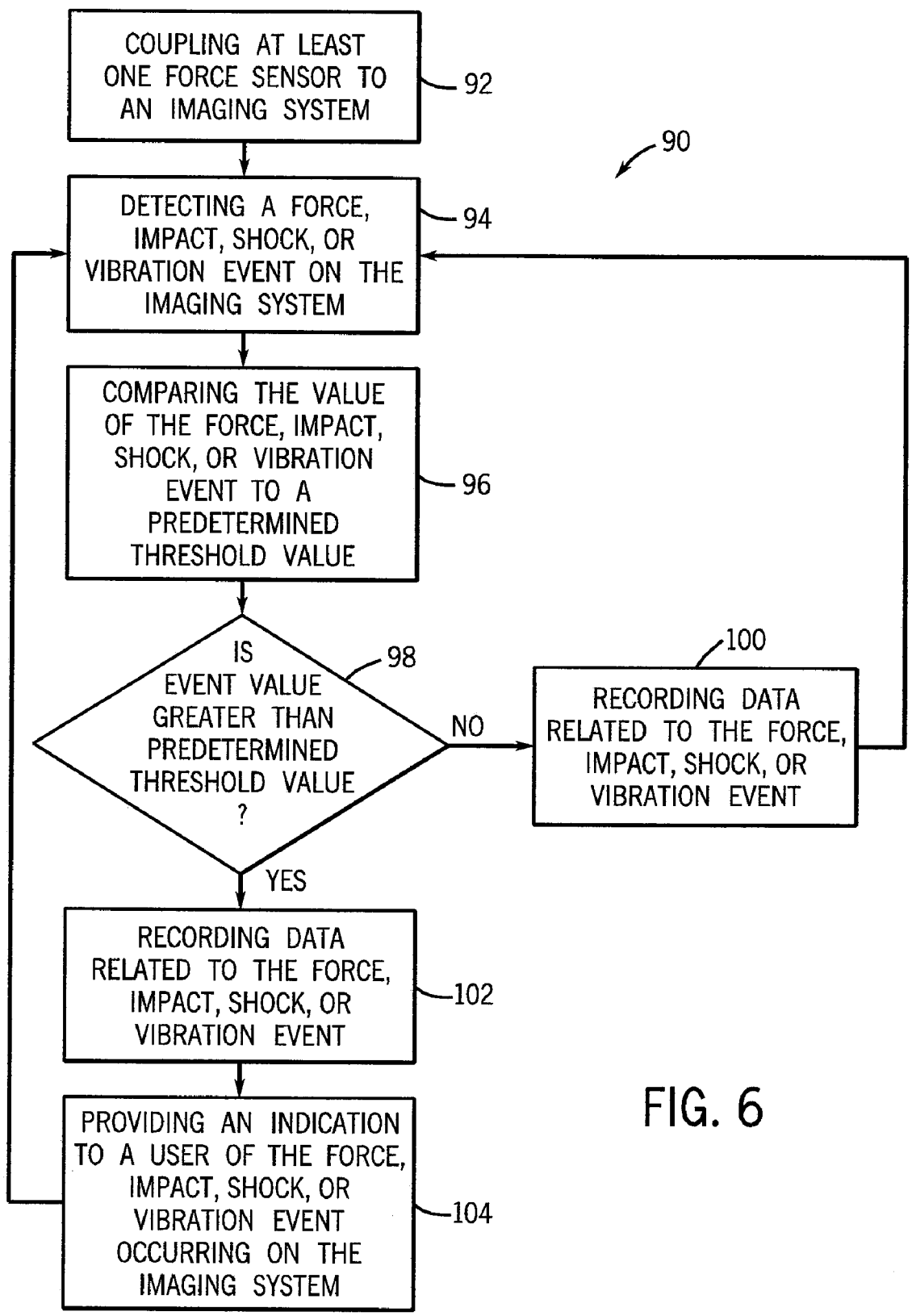
FIG. 6 is a flow diagram of yet another exemplary embodiment of a method of detecting a force, impact, shock, or vibration event on an imaging system.

FIG. 6 is a flow diagram of another exemplary embodiment of a method 90 of detecting a force, impact, shock, or vibration event on an imaging system. The method comprises coupling at least one sensor to an imaging system 92. The at least one sensor detecting a force, impact, shock, or vibration event on the imaging system 94. Comparing the value of the force, impact, shock, or vibration event to a predetermined threshold value 98. If the event value is not greater than the predetermined threshold value, then recording data related to the force, impact, shock, or vibration event 100. The at least one sensor coupled to the imaging system continues detecting force, impact, shock, or vibration events occurring on the imaging system. If the event value is greater than the predetermined threshold value, then recording data related to the force, impact, shock, or vibration event 102. And providing an indication to a user when a force, impact, shock, or vibration event occurs on the imaging system 104. The at least one sensor coupled to the imaging system may continue detecting force, impact, shock, or vibration events occurring on the imaging system. The method 90 may further comprise recording and storing the data related to each force, impact, shock, or vibration event in memory on the at least one sensor and/or in memory on the imaging system. The method 90 may further comprise transmitting event data to a receiver at a remote location for review by a service engineer.

The predetermined threshold value is selected based on suitable limits of force, impact, shock, or vibration for the imaging system. The predetermined threshold value can be a maximum value of the force, impact, shock, or vibration the imaging system can be subjected to, as specified in the warranty limits.

The invention provides a means to detect, record and indicate force, impact, shock, or vibration events occurring on an imaging system. These events can be experienced anywhere on the imaging system, including but not limited to the main assembly, the support assembly, the source and the detector. The data relating to the force, impact, shock, or vibration events can be stored for later review and analysis by a service engineer. The service engineer may review the data on-site, or remotely. Detection and documentation of these events reduces the need for periodic maintenance tests and field calibration by a service engineer, enhances the performance and reliability of the imaging system, and reduces the monetary burden on the manufacturer of the imaging system.

While the invention has been described with reference to a variety of embodiments, those skilled in the art will appreciate that certain substitutions, alterations and omissions may be made to the embodiments without departing from the spirit of the invention. Accordingly, the foregoing description is meant to be exemplary only, and should not limit the scope of the invention as set forth in the following claims.

What is claimed is:

1. An imaging system comprising:
   a main assembly;
   a support assembly coupled to the main assembly; and
   at least one sensor coupled to the imaging system;
   wherein the at least one sensor is designed to detect at least one of a non-imaging operation force, impact, shock, or vibration event occurring on the imaging system.

2. The imaging system of claim 1, further comprising at least one source and at least one detector.

3. The imaging system of claim 1, wherein the imaging system is a mobile imaging system.

4. The imaging system of claim 1, wherein the main assembly includes wheels.

5. The imaging system of claim 1, wherein the support assembly includes roller bearings or wheels.

6. The imaging system of claim 1, wherein the main assembly and the support assembly include roller bearings or wheels.

7. The imaging system of claim 1, wherein the at least one of the force, impact, shock, or vibration event occurring on the imaging system has a value above a predetermined threshold value.

8. The imaging system of claim 1, wherein the at least one sensor is designed to provide an indication that at least one of a force, impact, shock, or vibration event has occurred on the imaging system.

9. The imaging system of claim 8, wherein the indication is an acoustic indication.

10. The imaging system of claim 8, wherein the indication is a visual indication.

11. The imaging system of claim 8, wherein the indication is an acoustic indication and a visual indication.

12. The imaging system of claim 1, wherein the at least one sensor is a sensor array.

13. The imaging system of claim 1, wherein the at least one sensor is an attitude sensor to provide combined force and orientation information.

14. A mobile medical imaging system comprising:
    a main assembly;
    a support assembly coupled to the main assembly;
    at least one source;
    at least one detector; and
    at least one sensor coupled to the imaging system;
    wherein the at least one sensor is designed to detect at least one of a non-imaging operation force, impact, shock, or vibration event occurring on the imaging system.

15. The mobile medical imaging system of claim 14, wherein the detector is a digital flat panel detector.

16. The mobile medical imaging system of claim 14, wherein the at least one sensor is coupled to the main assembly.

17. The mobile medical imaging system of claim 14, wherein the at least one sensor is coupled to the support assembly.

18. The mobile medical imaging system of claim 14, wherein the at least one sensor is coupled to the source.

19. The mobile medical imaging system of claim 14, wherein the at least one sensor is coupled to the detector.

20. The mobile medical imaging system of claim 14, wherein the at least one sensor comprises:
    a detection device for detecting at least one of a force, impact, shock, or vibration event; and
    an indicator device for providing an indication to a user when an event occurs.

21. The mobile medical imaging system of claim 20, wherein the at least one sensor further comprises a memory device for recording and storing data related to the event.

22. The mobile medical imaging system of claim 21, wherein the memory device stores a predetermined threshold value for comparing to a value of the at least one of the force, impact, shock, or vibration event.

23. The mobile medical imaging system of claim 20, wherein the at least one sensor further comprises a processor for processing data related to the event.

24. The mobile medical imaging system of claim 20, wherein the at least one sensor further comprises a transceiver device for receiving and transmitting data.

25. The mobile medical imaging system of claim 14, wherein the at least one sensor is designed to detect at least one of a force, position, orientation, direction and gravitational force.

26. A method of detecting at least one force on a mobile medical imaging system, the method comprising:
    detecting at least one of a non-imaging operation force, impact, shock, or vibration event occurring on the imaging system; and
    providing an indication to a user when at least one of a non-imaging operation force, impact, shock, or vibration event occurs on the imaging system.

27. A method of detecting at least one force on a mobile medical imaging system, the method comprising:
    detecting at least one of a non-imaging operation force, impact, shock, or vibration event occurring on the imaging system;
    recording data related to the at least one of the non-imaging operation force, impact, shock, or vibration event; and
    providing an indication to a user when at least one of a non-imaging operation force, impact, shock, or vibration event occurs on the imaging system.

28. A method of detecting at least one force on an imaging system, the method comprising:
    coupling at least one sensor to the imaging system;
    detecting at least one of a non-imaging operation force, impact, shock, or vibration event on the imaging system;
    comparing a value of the at least one of the non-imaging operation force, impact, shock, or vibration event to a predetermined threshold value of the at least one sensor;
    recording data related to the at least one of the non-imaging operation force, impact, shock, or vibration event; and
    providing an indication to a user when the value of the at least one of non-imaging operation the force, impact, shock, or vibration event occurring on the imaging system is greater than the predetermined threshold value.

29. A system of detecting at least one force on a mobile medical imaging system comprising:
    at least one sensor coupled to the mobile medical imaging system;
    the at least one sensor detecting at least one of a non-imaging operation force, impact, shock, or vibration event on the imaging system;
    comparing a value of the at least one of the non-imaging operation force, impact, shock, or vibration event to a predetermined threshold value of the at least one sensor;
    recording data related to the at least one of the non-imaging operation force, impact, shock, or vibration event; and
    providing an indication to a user when the value of the at least one of the non-imaging operation force, impact, shock, or vibration event occurring on the imaging system is greater than the predetermined threshold value.

30. The imaging system of claim 1, wherein the imaging system is a medical imaging system.

* * * * *